United States Patent
Simon (10) Patent No.: US 9,376,121 B2
(45) Date of Patent: Jun. 28, 2016

(54) METHOD AND DISPLAY UNIT FOR DISPLAYING A DRIVING CONDITION OF A VEHICLE AND CORRESPONDING COMPUTER PROGRAM PRODUCT

(75) Inventor: Stephan Simon, Sibbesse (DE)

(73) Assignee: ROBERT BOSCH GMBH, Stuttgart (DE)

( * ) Notice: Subject to any disclaimer, the term of this patent is extended or adjusted under 35 U.S.C. 154(b) by 8 days.

(21) Appl. No.: 14/126,208

(22) PCT Filed: Jun. 15, 2012

(86) PCT No.: PCT/EP2012/061480
§ 371 (c)(1),
(2), (4) Date: Mar. 25, 2014

(87) PCT Pub. No.: WO2012/172067
PCT Pub. Date: Dec. 20, 2012

(65) Prior Publication Data
US 2014/0225721 A1    Aug. 14, 2014

(30) Foreign Application Priority Data

Jun. 17, 2011 (DE) .......................... 10 2011 077 767
Jun. 15, 2012 (DE) .......................... 10 2012 210 128

(51) Int. Cl.
*B60Q 1/00*     (2006.01)
*B60W 50/14*    (2012.01)
(Continued)

(52) U.S. Cl.
CPC ................ *B60W 50/14* (2013.01); *B60K 35/00* (2013.01); *B60K 37/02* (2013.01); *B60W 30/095* (2013.01);
(Continued)

(58) Field of Classification Search
CPC ................................ B60Q 9/008; G01S 11/12
USPC .......... 340/345, 901, 904, 932, 988, 435, 436,
340/540, 541, 932.2; 701/41, 45, 93
See application file for complete search history.

(56) References Cited

U.S. PATENT DOCUMENTS

| 4,095,551 A | 6/1978 | Paul et al. | |
|---|---|---|---|
| 5,808,561 A * | 9/1998 | Kinoshita | .......... B60K 31/0008 180/167 |

(Continued)

FOREIGN PATENT DOCUMENTS

| DE | 198 00 202 | 7/1999 |
|---|---|---|
| DE | 198 21 163 | 11/1999 |

(Continued)

OTHER PUBLICATIONS

International Search Report for PCT/EP2012/061480, dated Oct. 8, 2012.

*Primary Examiner* — Tai T Nguyen
(74) *Attorney, Agent, or Firm* — Norton Rose Fulbright US LLP (57) ABSTRACT

A method for determining an item of control information for displaying a driving condition of a vehicle with the aid of a display unit includes: an ascertainment of the safe driving condition of the vehicle, in which no risk of a collision with an object exists; an ascertainment of a prevailing driving condition of the vehicle in relation to the safe driving condition is carried out; a determination of the item of control information for activating the display unit based on the safe driving condition and the prevailing driving condition, the item of control information causing a display of an item of information about the prevailing driving condition in relation to an item of information about the safe driving condition by the display unit.

15 Claims, 7 Drawing Sheets

(51) Int. Cl.
   *B60K 35/00*     (2006.01)
   *B60W 30/095*    (2012.01)
   *G01P 1/08*      (2006.01)
   *G01D 7/02*      (2006.01)
   *B60K 37/02*     (2006.01)

(52) U.S. Cl.
   CPC .. *G01D 7/02* (2013.01); *G01P 1/08* (2013.01); *B60K 2350/1064* (2013.01); *B60K 2350/1084* (2013.01); *B60K 2350/2056* (2013.01); *B60K 2350/2065* (2013.01); *B60K 2350/352* (2013.01); *B60K 2350/403* (2013.01); *B60K 2350/408* (2013.01); *B60W 2050/146* (2013.01)

(56) References Cited

U.S. PATENT DOCUMENTS

| | | | |
|---|---|---|---|
| 6,737,963 B2 * | 5/2004 | Gutta | B60Q 9/008 180/271 |
| 6,922,139 B2 | 7/2005 | Vagstedt | |

FOREIGN PATENT DOCUMENTS

| | | |
|---|---|---|
| DE | 198 47 611 | 4/2000 |
| DE | 103 54 641 | 6/2005 |
| DE | 10 2005 057636 | 6/2007 |
| DE | 10 2008 032 546 | 2/2009 |
| DE | 10 2007 061 723 | 6/2009 |
| DE | 10 2008 019 461 | 10/2009 |
| DE | 10 2009 048285 | 4/2010 |
| DE | 10 2009 049 592 | 4/2011 |
| EP | 2 143 587 | 7/1999 |
| JP | 2001/202 600 | 7/2001 |
| JP | 2001-202600 | 7/2001 |
| JP | 2002-163798 | 6/2002 |
| JP | 2005/329 811 | 12/2005 |
| JP | 2007/245 835 | 9/2007 |
| JP | 2010-155755 | 7/2010 |
| JP | 2010-205117 | 9/2010 |
| JP | 2012018566 A | 1/2012 |
| KR | 882846 | 2/2009 |

* cited by examiner

METHOD AND DISPLAY UNIT FOR DISPLAYING A DRIVING CONDITION OF A VEHICLE AND CORRESPONDING COMPUTER PROGRAM PRODUCT

BACKGROUND OF THE INVENTION

1. Field of the Invention

The present invention relates to a method for displaying a driving condition of a vehicle, a display unit for displaying a driving condition of a vehicle, a corresponding device, and a corresponding computer program product.

2. Description of the Related Art

The dashboard of motor vehicles is usually dominated by two display instruments, the speedometer and the tachometer. U.S. Pat. No. 6,922,139 B2 describes a display instrument for a vehicle, using which the velocity associated with the vehicle, on the one hand, and the velocity relating to another vehicle, on the other hand, may be displayed.

BRIEF SUMMARY OF THE INVENTION

Against this background, the present invention provides a method for displaying a driving condition of a vehicle, a display unit for displaying a driving condition of a vehicle, a method for assisting a driver of a vehicle in a driving task with the aid of a display unit, furthermore, a device which uses this method, and finally a corresponding computer program product.

With the aid of the approach according to the present invention, the driver of a vehicle may be assisted in controlling the distance, for example, to a preceding vehicle. For this purpose, a prevailing driving condition of the vehicle, in which under certain circumstances a collision with the preceding vehicle threatens, may be displayed to the driver in relation to a safe driving condition of the vehicle, in which no collision threatens. The driver may thus be assisted in transferring the prevailing driving condition to the safe driving condition. The display unit may be implemented as a so-called time-to-collision speedometer, which displays a point in time until a collision of the vehicle with another vehicle or an object. The display unit may be provided as an additional instrument of a dashboard of the vehicle or instead of the tachometer.

While the speedometer must always be given attention merely because of maintaining the speed limits, the tachometer display is not of interest for most drivers. This is true in particular for drivers of vehicles having automatic transmission or continuously variable transmission, since they are freed of the task of gear shifting in any case. However, many drivers of manual transmission vehicles shift more according to sound than according to the tachometer.

According to one specific embodiment of the present invention, the tachometer is replaced by a time-to-collision speedometer (abbreviated as TTC speedometer). The TTC speedometer may display an assumed time until a collision.

Of course, the TTC speedometer may also represent a supplement to the already provided instruments.

Automobile drivers will perceive the TTC speedometer to be very useful and intuitive, in particular because its displayed variable, the "time to collision", i.e., the time until the virtual impact, comes very close to the variable which a human calculates with the aid of his visual system, to perceive the driving task, more precisely the partial task, specifically the distance control to the preceding vehicle.

The TTC speedometer is outstandingly suitable for use in combination with an ACC driver assistance system (ACC=adaptive cruise control), which controls the distance to one or multiple preceding vehicle(s). ACC systems are already known and are mostly based on radar sensors, partially also on lidar sensors. More recently, however, multiple sensors have also been combined, for example, radar and video, to improve and expand the ACC function.

During the normal ACC following travel behind a so-called target object, the driver does not need to actuate gas and brake pedals. If the system is no longer capable of tracking the object, it prompts the driver to take over the driving task. During the usage of the ACC system, the driver is mostly informed only rudimentarily or not at all about the system status of the ACC controller. One cause of this is partially the uncertainty of the measuring data, using which the ACC controller must operate.

The most recent developments have shown, however, that video-based tracking, i.e., object tracking, is possible in previously unknown quality using a monocular camera.

This image-based tracking opens up the possibility of determining the time to collision (TTC) to one or multiple target object(s) at any point in time and in the cycle of the image recording, typically 25 images per second, but other cycles are also possible.

The human as the driver is also dependent solely on the visual information to control the distance to the preceding vehicle. Since stereoscopic vision hardly still plays a role in the typical distance ranges up to the preceding vehicle, the human determines with his eyes, in particular, size changes of the image of the target object, to recognize whether it approaches or moves away observed relatively. This task may thus also be fulfilled well using only one eye, which is confirmed by experience.

An image-based tracking method may also require only one camera and determines the size change of the object with a substantially higher precision than a human is capable of.

As a result of the high quality of the measurement results, it is therefore possible to activate a display instrument such as a TTC speedometer and to display a correct signal, which is free of noticeable interference.

It will also be possible to use the signals of the previous routine sensors, such as radar or lidar, for activating the TTC speedometer, optionally after suitable filtering.

The present invention provides a method for determining an item of control information for displaying a driving condition of a vehicle with the aid of a display unit of the vehicle, the method including the following steps:
ascertaining a safe driving condition of the vehicle in which no risk of a collision with an object exists;
ascertaining a prevailing driving condition of the vehicle in relation to the safe driving condition; and
determining the item of control information for activating the display unit based on the safe driving condition and the prevailing driving condition, the item of control information being designed to cause a display of an item of information about the prevailing driving condition in relation to an item of information about the safe driving condition by the display unit.

The display unit may be situated in a dashboard of the vehicle and may be designed as a TTC speedometer, for example. The object may be a stationary object, a stationary other vehicle, or another preceding or trailing vehicle. The display unit may have a scale and additionally or alternatively different sectors. With the aid of the display unit, it may be displayed to the driver how a prevailing driving condition behaves in relation to a safe driving condition. In the safe driving condition, a distance between the vehicle and another vehicle does not change or only changes within a predefined tolerance range. Therefore, there is no collision risk. If the prevailing driving condition corresponds to the safe driving condition, the prevailing driving condition may be displayed as the safe driving condition, for example, in that a pointer, which displays the prevailing driving condition, is located within a sector of the display unit associated with the safe driving condition. If the distance to the other vehicle changes, the prevailing driving condition thus does not correspond to the safe driving condition. In this case, a deviation between the prevailing driving condition and the safe driving condition may be displayed with the aid of the display unit, for example, in that the pointer, which indicates the prevailing driving condition, is located outside the sector of the display unit associated with the safe driving condition. Therefore, the prevailing driving condition may either correspond to a condition in which a risk of a collision between the vehicle and the other vehicle exists, or may correspond to a condition in which no risk of a collision between the vehicle and the other vehicle exists. The condition that no risk of a collision exists may be subdivided into the safe driving condition and into a further condition, in which a distance between the vehicle and the other vehicle progressively increases. With the aid of an item of auxiliary information, it may be displayed to the driver that he may transfer the vehicle into the safe driving condition proceeding from the prevailing driving condition either by a reduction of the velocity or by an increase of the velocity. To ascertain both the safe driving condition and also the prevailing driving condition, present measuring data may be analyzed. The measuring data may be received via interfaces from sensors of the vehicle. The measuring data may relate to data related to the vehicle, for example, the velocity of the vehicle. The measuring data may also include data relating to the other vehicle, for example, a distance or a relative velocity between the vehicle and the other vehicle. A change or maintenance of the distance between the vehicle and the other vehicle may also be determined by an analysis of chronologically successive image recordings of the other vehicle, which were acquired by an image acquisition unit of the vehicle. Thus, in a first image recording, a first dimension of a structure of the other vehicle, which is imaged in the image recording, may be determined and in a second image recording which is acquired chronologically thereafter, a second dimension of the same structure of the other vehicle, which is imaged in the image recording, may be determined. It may be ascertained by a comparison of the dimensions whether the vehicles approach one another, move away from one another, or maintain a constant distance. To ascertain the prevailing driving condition, a distance change between the vehicle and the other vehicle over time, which is ascertained in this way or another way, may be analyzed. A present velocity difference between the vehicle and the other vehicle may also be analyzed. If the distance remains constant or if no velocity difference exists, the safe driving condition is provided. If the distance changes or a velocity difference exists, the prevailing driving condition thus does not correspond to the safe driving condition. A velocity may be associated with the safe driving condition, which, if it is maintained, does not have any collision risk. The relative velocity may be associated with the prevailing driving condition. A value based on the relative velocity and the distance between the vehicles may also be associated with the prevailing driving condition. If the relative velocity is not equal to zero, the risk of an impact or a possibly unintentional increase of the distance between the vehicles exists. The relative velocity is dependent on the velocity of the vehicle: A deviation may therefore be shown via the display unit, which corresponds to a deviation of the present velocity from the safe velocity or is based on this deviation. The deviation may be shown in a suitable scaling. The item of control information may be provided as an electrical signal via an interface to the display unit.

According to one specific embodiment, the item of information about the prevailing condition may include an item of information about a duration until a collision between the vehicle and the object. For this purpose, a value of the duration may be displayed directly or a pointer which displays the prevailing driving condition may point to a corresponding value. This gives the driver a suggestion of how rapidly he must react to reach the safe driving condition.

The display unit may have a marking associated with the safe driving condition. In this case, the method may include a step of carrying out a comparison between the safe driving condition and the prevailing driving condition and the item of control information may be designed to show the item of information about the prevailing driving condition in relation to the marking depending on the comparison. For example, a safe velocity of the vehicle, at which no collision risk exists, may be associated with the safe driving condition. The safe velocity may be compared to a present velocity of the vehicle in the comparison. A velocity difference ascertained by the comparison may be shown on the display unit. The relationship may be shown by a distance between the marking and a display element displaying the prevailing driving condition, for example, a pointer. For example, the distance may be greater the greater the velocity difference. The marking associated with the safe driving condition makes it easier for the driver to estimate the prevailing driving condition.

The display unit may include a first sector, which is associated with a first driving condition, in which a distance between the vehicle and the object remains at least approximately constant, may include a second sector, which is associated with a second driving condition, in which the distance between the vehicle and the object decreases, and may include a third sector, which is associated with a third driving condition, in which the distance between the vehicle and the object increases. The item of control information may be designed to show the prevailing driving condition in the first, the second, or the third sector depending on the comparison. The sectors may be formed in different colors. For example, the second sector may include a warning color. The driver may grasp the information shown on the display unit more easily by way of the sectors. Alternatively, the display unit may have another suitable number of sectors. The display unit may also have a line or a dot instead of a sector. The display unit may thus also have, for example, 2½ sectors, i.e., two sectors and a dot, four sectors, or five sectors. One suitable driving condition may be associated with each of the different sectors, lines, or dots.

The item of control information may be designed in this case to set a size ratio between the first, the second, and the third sectors depending on the item of information about the velocity of the vehicle. The display space available on the display unit may thus be utilized optimally to display the relevant items of information.

The present invention also provides a display unit for displaying a driving condition of a vehicle, having the following features:

a first display area, which is associated with a first driving condition, in which a distance between the vehicle and an object remains at least approximately constant;

a second display area, which is associated with a second driving condition, in which the distance between the vehicle and the object decreases;

a third display area, which is associated with a third driving condition, in which the distance between the vehicle and the object increases; and an interface for receiving an item of control information for activating the display unit, to cause a display of an item of information about a prevailing driving condition of the vehicle in relation to an item of information about a safe driving condition of the vehicle.

The display unit may be an analog instrument, for example, a pointer instrument. The display unit may also have a display screen, on which the relevant items of information may be overlaid. A part of a surface of the display unit visible to the driver or a display element used by the display unit may be associated with each display area. A display area may include a plane element, a line, or a dot. The plane element may represent a sector or a strip, for example.

According to one specific embodiment, the display unit has a display area for displaying an image of the object. This makes it easier for the driver to find a connection between the real traffic events and the displayed information.

Furthermore, the present invention provides a method for assisting a driver of a vehicle in a driving task with the aid of a display unit, which includes the following steps:
determining an item of control information according to one specific embodiment of the present invention;
providing the item of control information on a display unit according to one specific embodiment of the present invention; and
displaying an item of information about a prevailing driving condition in relation to an item of information about a safe driving condition of the vehicle with the aid of the display unit, in response to the item of control information.

Furthermore, the present invention also provides a device, which is designed to carry out or implement the steps of the method according to the present invention in corresponding units. The object on which the present invention is based may also be achieved rapidly and efficiently by this embodiment variant of the present invention in the form of a device. A device may be understood in the present case as an electrical device, which processes sensor signals and outputs control signals as a function thereof. The device may have an interface, which may be designed in hardware and/or software. In the case of a hardware design, the interfaces may be part of a so-called system ASIC, for example, which contains greatly varying functions of the device. However, it is also possible that the interfaces are separate integrated circuits or are made at least partially of discrete components. In the case of a software design, the interfaces may be software modules, which are provided on a microcontroller in addition to other software modules, for example.

A computer program product having program code is also advantageous, which may be stored on a machine-readable medium such as a semiconductor memory, a hard drive memory, or an optical memory, and may be used to carry out the method as recited in one of the above-described specific embodiments when the program is executed on a device corresponding to a computer.

DETAILED DESCRIPTION OF THE INVENTION

Identical or similar reference numerals are used for the similarly acting elements shown in the various figures in the following description of preferred exemplary embodiments of the present invention, a repeated description of these elements being omitted.

Figure 1:
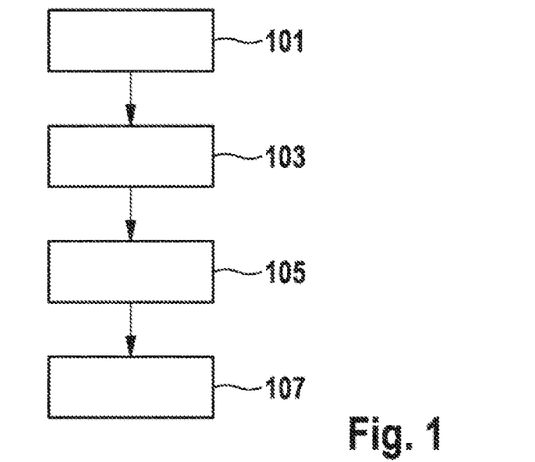
FIG. 1 shows a flow chart of a method for displaying a safe driving condition of the vehicle according to one exemplary embodiment of the present invention.
Figure 1A:
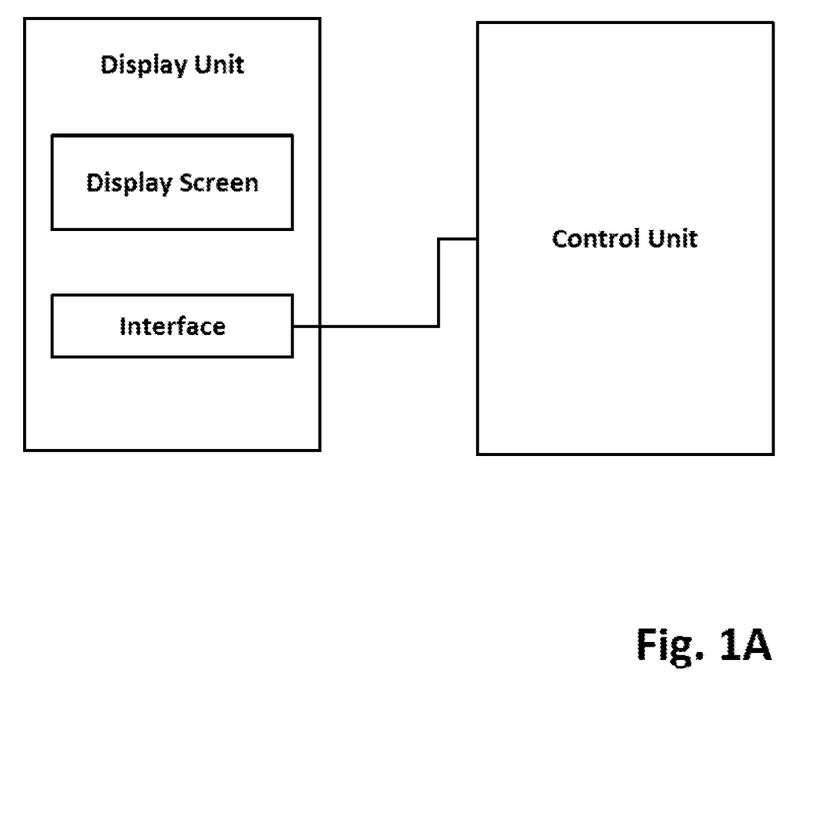
FIG. 1A shows a block diagram of a device for displaying a safe driving condition of a vehicle according to one exemplary embodiment of the present invention.

FIG. 1 shows a flow chart of a method for displaying a safe driving condition of a vehicle according to one exemplary embodiment of the present invention. In a step 101, a safe driving condition of the vehicle is ascertained, in which no risk of a collision with the other vehicle exists. In a step 103, a prevailing driving condition of the vehicle is ascertained. In a step 105, based on the safe driving condition and the prevailing driving condition, an item of control information for activating a display unit is determined, which is suitable for causing a display of an item of information about the prevailing driving condition in relation to an item of information about the safe driving condition by the display unit. In a step 107, the item of control information is output on the display unit, to show the item of information about the prevailing driving condition in relation to the item of information about the safe driving condition with the aid of the display unit. The display unit may be a TTC speedometer, as described in the following exemplary embodiments in different variants.

According to one exemplary embodiment, time-to-collision $T_{TC}$, i.e., the time until a possible collision, is indicated with the aid of the display unit.

The TTC is generally known, but will nonetheless be explained briefly here, in particular with regard to its visual or camera-based determination.

A simplified scenario is considered having constant differential velocity $v = v_{Host} - v_{Obj}$ between the host vehicle and a collision-relevant object. Negative differential velocity means that the objects move toward one another. The instantaneous distance is d. The time to collision is then $$T_{TC} = -\frac{d}{v}.$$

A camera connected to the host vehicle tracks two points on the object, whose distance parallel to the camera plane is W. In the image of the camera, according to the pinhole camera model, having focal length f, a distance therefore results of $$w = \frac{Wf}{d}.$$

In contrast, at the point in time which is earlier by time difference T, the following equation applies $$w_P = \frac{wf}{d - vT}.$$

If one defines $$s = \frac{w}{w_P}$$

as a scaling factor between the images of different sizes of distance W, the following equation results $$s = \frac{w}{w_P} = \frac{d - vT}{d} = 1 - \frac{v}{d}T = 1 + \frac{T}{T_{TC}}$$

or $$T_{TC} = \frac{T}{s - 1}.$$

Several typical situations are considered hereafter.

During following travel at a constant distance, the image size remains unchanged, $w=w_p$ or $s=1$. Therefore, the time until a collision is infinite, TTC=∞. A longitudinal regulator for the following travel behind an object, which controls acceleration and braking, will thus seek out TTC=∞ at this point.

During an approach to an object, $w>w_p$ or $s>1$. Accordingly, the TTC has a positive value. A numeric example: Using an image period of T=40 ms and distances of w=102 pixels and $w_p$=100 pixels, TTC=2.0 seconds results.

If the object moves away, for example, a passing vehicle, thus $w<w_p$ or $s<1$. The TTC has a negative value.

At the point in time of the collision TTC=0 or very closely before or after this, the scaling factor s approaches +∞ or −∞.

The possibility of image-based determination of the TTC, insofar as described previously, has been known for decades.

The above-described TCC relates to the point in time of the collision of the object, more precisely the points observed on the object, with the camera. However, the point in time of collision with the host vehicle front is of interest for practical application.

With knowledge of host velocity $v_{Host}$, $T_{TCCam}$ with respect to the camera may be converted into a $T_{TCFront}$ with respect to the vehicle front, for example, the bumper: $T_{TCFront}=T_{TCCam}-l/v_{Host}$. Length l is the distance in the longitudinal direction, the travel direction, between the camera and the vehicle front. Example: At l=2 m and $v_{Host}$=20 m/s, $T_{TCFront}$ is 0.1 seconds less than $T_{TCCam}$.

This calculation represents a simplification, because it leaves velocity $v_{Obj}$ of the object unconsidered. Since in the observed scenario the forward travel of the host vehicle and, neglecting the reversing of the preceding vehicle, the host velocity is always greater in absolute value than the differential velocity, the simplification is an estimation toward the safe side. The $T_{TCFront}$ thus determined is generally somewhat less than the actual TTC.

According to one exemplary embodiment, $T_{TCFront}$ is displayed to the driver, possibly even a TTC, which relates to a plane even ahead of the vehicle front, whereby a safety reserve results.

Figure 2:
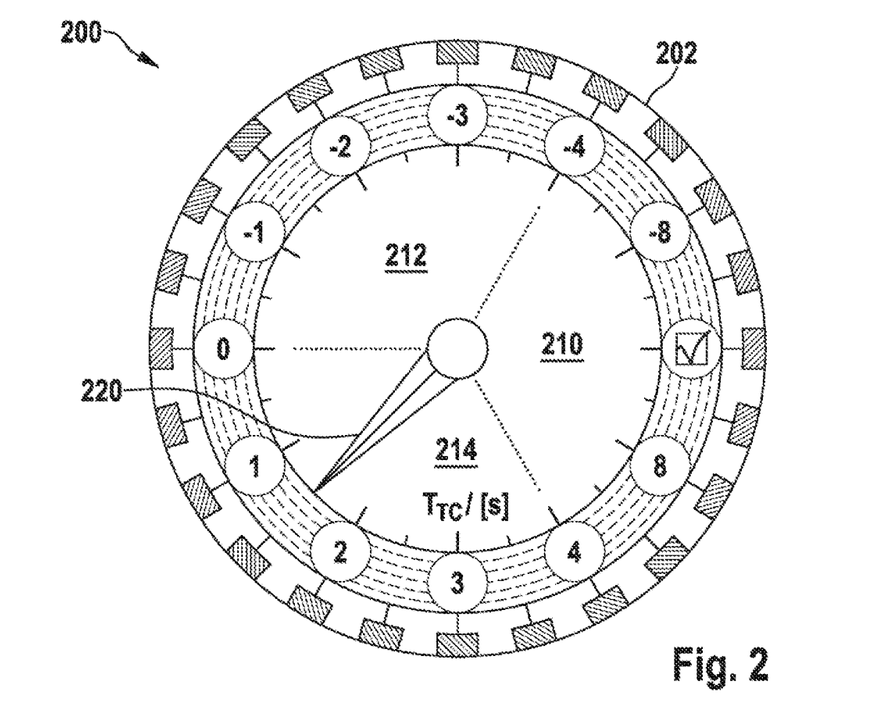
FIG. 2 shows a view of a display unit according to one exemplary embodiment of the present invention.

FIG. 2 shows a view of a display unit 200 according to one exemplary embodiment of the present invention. Display unit 200 has a circular scale 202. The number 0 is shown on the left and a symbol in the form of a check mark is shown on the right on scale 202. In the top half, the numbers −1, −2, −3, −4, and −8 are shown on scale 202 proceeding from the number 0. In the bottom half, the numbers 1, 2, 3, 4, and 8 are shown on scale 202 proceeding from the number 0. The numbers allow a fundamental display of the TTC. The numbers indicate a time until the collision in seconds here. Scale 202 encloses a circle, which is divided into three sectors 210, 212, 214. A sector boundary between sectors 212, 214 is located at the number 0. A sector boundary between sectors 210, 212 is located at the number −4. A sector boundary between sectors 210, 214 is located at the number 4. The word "follow" may be shown inside sector 210. The word "accelerate!" may be shown inside sector 212. The word "brake!" may be shown inside sector 214. Alternatively, the requests "follow", "brake", and "accelerate" may also reasonably be shown in the form of symbols, so-called icons. A pointer 220 represents a prevailing driving condition. Pointer 220 presently points in sector 214 to the middle between numbers 1 and 2. In the event of a change of the prevailing driving condition or a change of the safe driving condition, pointer 220 changes its position. The elements of display unit 200 shown may be displayed completely or partially on a display screen or projected in a field of vision of the driver.

Display unit 200 shown in FIG. 2 represents a possible embodiment for a TTC speedometer, designed here as a pointer instrument. For ideal following travel, pointer 220 must be steered to the right to the point of scale 202 identified with a check mark with the aid of gas and brake pedal actuation.

During following travel at a constant distance, TTC=∞. This ideal point is to be sought both by an automatic cruise control (ACC) and by a human driver. This point is identified here with a check mark. The point represents the setpoint state.

Furthermore, scale 202 is shown, on which the TTC is plotted in seconds. The dotted lines divide scale 202 into the three sectors 210, 212, 214 of 120° each here.

If pointer 220 is located in the bottom left sector 214, identified by "brake!", of TTC from 0 seconds to 4 seconds, a braking intervention is necessary, and all the more urgently the closer the pointer comes to the number zero.

In top left sector 212, identified with "accelerate!", of TTC from 0 seconds to −4 seconds, acceleration may or should be carried out, if the object is to be followed.

If the pointer is located in right sector 210, identified with "follow", activity is not necessary or is not yet urgently necessary.

While for the other two sectors 212, 214, a linear scale 202, i.e., a linear curve of the TTC with the pointer angle, was selected here, it is strongly nonlinear in right field 210. As is apparent, scale 202 extends through the infinity point, more precisely, −∞ and +∞ are coincident here. A nonlinear scale 220 for the TTC is necessary at least for this sector 210.

The driver does not have to know or understand such technical details. It is only important for the driver to know how he/she may influence the position of pointer 220 using gas and brake pedals, and that he/she is to keep pointer 220 as much as possible close to the setpoint, which may also be identified or emphasized in a way other than by a check mark.

Figure 3:
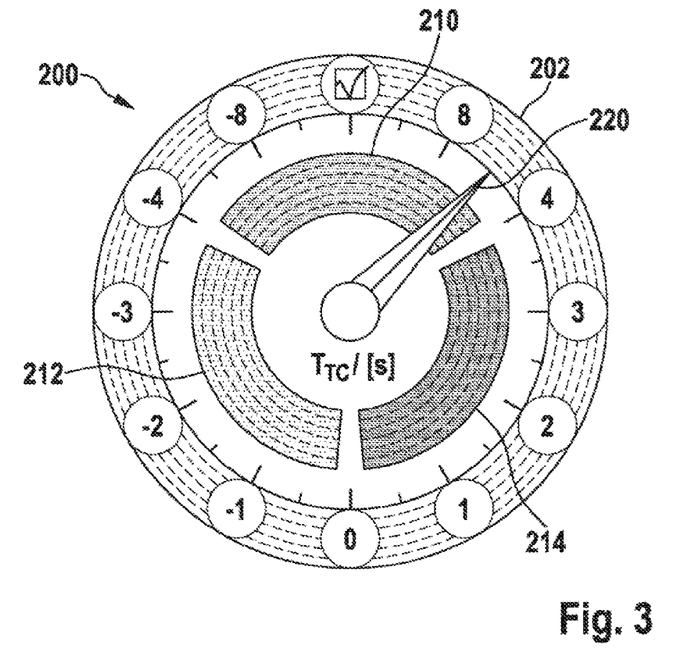
FIG. 3 shows a view of another display unit according to one exemplary embodiment of the present invention.

FIG. 3 shows a TTC speedometer 200, according to another exemplary embodiment of the present invention. The infinity point or setpoint is located on top here. A further difference from the TTC speedometer shown in FIG. 2 is that sectors 210, 212, 214 are designed to be colored. Thus, sector 210 is shown in green, sector 212 is shown in blue, and sector 214 is shown in red. The expressions "follow", "brake!", and "accelerate!" may again be shown inside sectors 210, 212, 214. Sectors 210, 212, 214 are also shown here by ring-shaped areas.

Therefore, FIG. 3 shows an alternative form of TTC speedometer 200. This TTC speedometer 200 differs from TTC speedometer 200 shown in FIG. 2 primarily in the orientation of scale 202. The point at which pointer 220 is to be held is located on top here.

This possibly represents the most intuitive embodiment, because the similarity to the speedometer for the velocity is great here. If pointer 220 is located on the bottom left, acceleration may be carried out, if it is located far to the right, the risk increases.

In addition, sectors 210, 212, 214 are backed with intentionally selected colors according to this exemplary embodiment.

Blue stands for "free travel", for example, an association with the blue display light for the high beams.

Red stands for "braking", such as the red brake lights of the preceding vehicle or the red traffic light or the red stop sign.

Green stands for "correct" driving, but also for an "economical" manner of driving. A driver who intentionally utilizes the green area to leave the pointer "oscillating" therein, i.e., avoids frequent acceleration and braking, is also automatically traveling economically.

Figure 4:
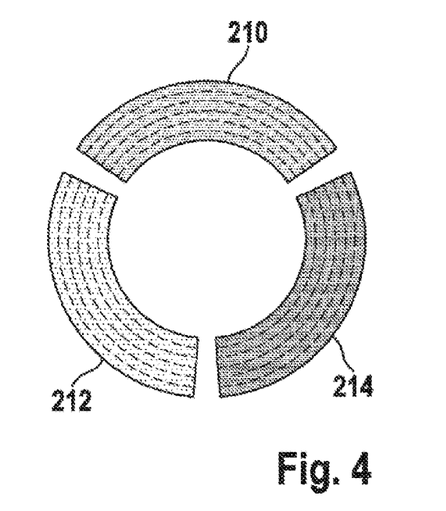
FIG. 4 shows a view of a detail of a display unit.
Figure 5:
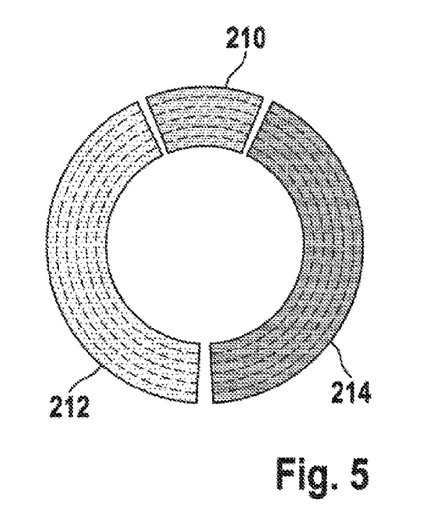
FIG. 5 shows another view of a detail of a display unit.

FIGS. 4 and 5 each show a view of a detail of a display unit having adaptive sectors 210, 212, 214 according to one exemplary embodiment of the present invention. According to this exemplary embodiment, the sizes of sectors 210, 212, 214 may be adapted to the vehicle velocity. At high velocity, shown in FIG. 5, a narrower green area in the form of sector 210 results for the following travel than at low velocity, shown in FIG. 4. The other sectors 212, 214 are adapted accordingly in their size. Sector 212 is shown in blue and sector 214 is shown in red. The expressions "follow", "brake!", and "accelerate!" may again be shown inside sectors 210, 212, 214.

According to this exemplary embodiment, the sector sizes are varied as a function of the velocity, as shown in FIG. 4. This is based on the fact that the time for braking to a standstill grows approximately linearly with $v_{Host}$, in the case of assumed constant maximum deceleration.

The target object does also require a similar braking time in the normal case, which provides an additional safety reserve. However, this safety reserve is not to be utilized, because it is not available in all situations, for example, in the event of impact of the target object on the tail end of a traffic jam or a multiple car pileup.

Green area 210 may be designed, for example, in such a way that it approximately begins at the total time which results from the summation of deceleration time, reaction time of the human, and latency time of the brake system.

Figures 6, 7:
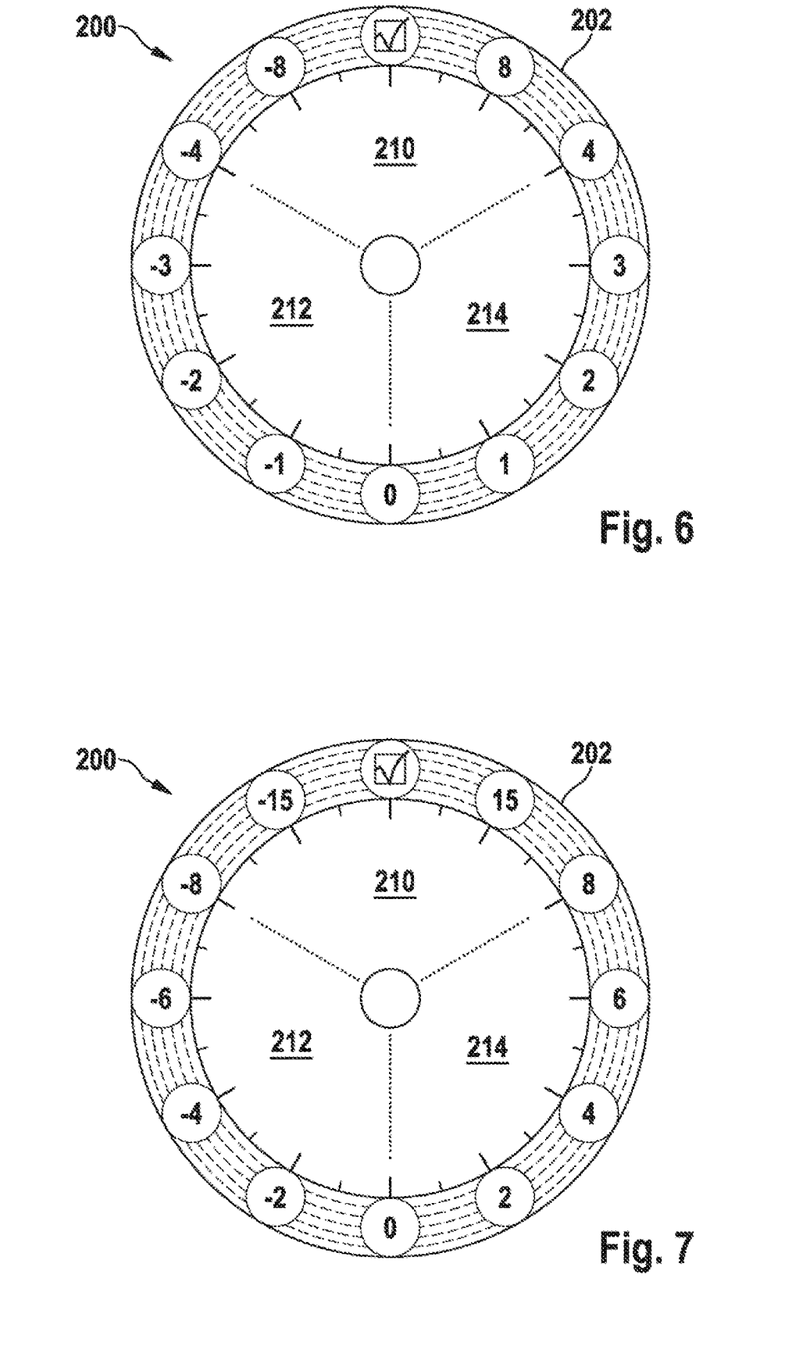
FIG. 6 shows a view of a display unit according to one exemplary embodiment of the present invention.
FIG. 7 shows another view of another display unit according to one exemplary embodiment of the present invention.

FIGS. 6 and 7 each show a view of a display unit 200 having an adaptive inclination of scale 202 according to one exemplary embodiment of the present invention. According to this exemplary embodiment, instead of the sector sizes of sectors 210, 212, 214, scales 202 may be adapted to the vehicle velocity. In FIG. 6, scale 202 is adapted for low velocity. In FIG. 7, scale 202 is adapted for a higher velocity. The numbers of scale 202 in FIG. 7 are accordingly 0, 2, 4, 6, 8, 15, and −2, −4, −6, −8, −15. The expressions "follow", "brake!", and "accelerate!" may again be shown inside sectors 210, 212, 214. A sector boundary between sectors 212, 214 is located at the number 0. A sector boundary between sectors 210, 212 is located at the number −8. A sector boundary between sectors 210, 214 is located at the number 8.

According to this exemplary embodiment, alternatively to an adaptation of sectors 210, 212, 214, the scale values of scale 202 may also be changed, in that the scale lines and the numbers "travel" depending on the intrinsic velocity, for example. This inclination of scale 202 is easy to implement, if TTC speedometer 200 is partially or entirely designed as a display screen. FIGS. 6 and 7 show an example of a corresponding scale adaptation.

According to one exemplary embodiment of the present invention, an intervention of the driver or the vehicle dynamics program in the representation of the display unit is made possible.

It may be reasonable to give the driver intervention options in the representation. For example, he could change the size of sectors 210, 212, 214 or the inclination of scale 202 by manual actuation of operating elements. A control unit for activating display unit 200 may have a suitable interface to one or multiple operating elements for this purpose and may be designed to permit data received via the interface to be incorporated in a design of the information shown by display unit 200.

Such an exemplary embodiment has the advantage for the driver of being able to adapt display instrument 200 to his driving style, for example, from "economical" via "normal" to "sporty-dynamic".

The type of the TTC representation may also be coupled to the position of a selector switch for the selection of the vehicle dynamics program, as is prevailingly already available for many vehicle models.

Figure 8:
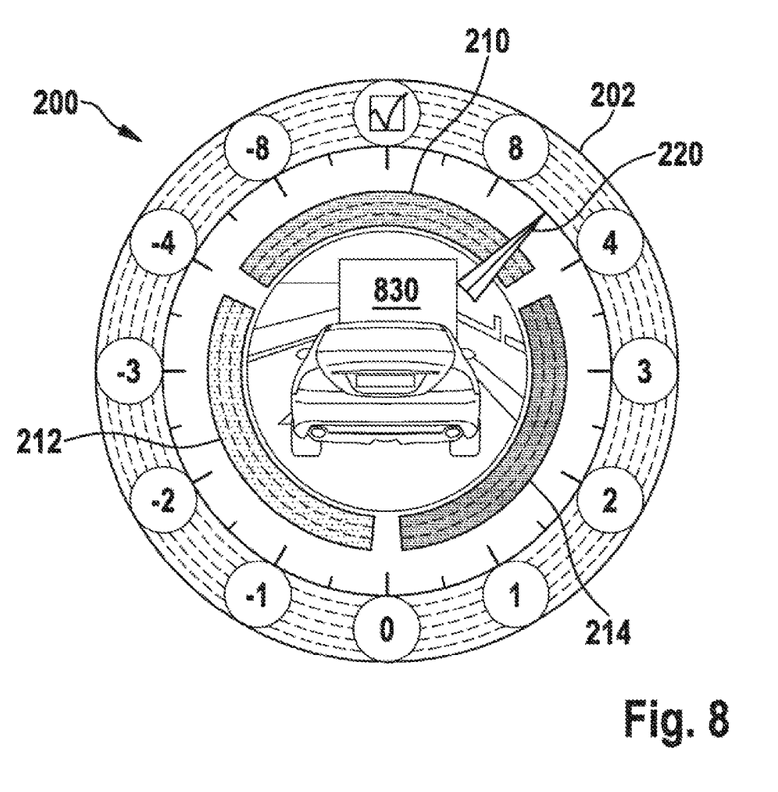
FIG. 8 shows another view of another display unit according to one exemplary embodiment of the present invention.

FIG. 8 shows a TTC speedometer 200 according to another exemplary embodiment of the present invention. In contrast to the exemplary embodiment shown in FIG. 3, an image 830 of the presently tracked object, the target object, is shown in TTC tachometer 200 as auxiliary information. Only the essential part, the tip, is shown of pointer 220. Sectors 210, 212, 214 are situated in a ring shape inside scale 202. Image 830 is shown in a circular inner area enclosed by sectors 210, 212, 214. Image 830 may be acquired by a camera situated on the vehicle and provided via a suitable interface to a control unit for activating TTC speedometer 200. Display unit 200 may accordingly have an integrated video display screen having an automatically selected image detail 830.

In previous ACC systems, the driver does not explicitly experience to which target object the system is presently controlled. In a camera-based system or in a system which also has at least one camera in addition to other sensors, the target object may be displayed to the driver as image 830, for example, in the form shown in FIG. 8, if the technical conditions are provided, in particular the image display capability here.

All items of information which are necessary to "cut out" the correct target object from the camera image are provided in such a system.

Detail 830 from the original image may optionally always have a fixed size, the displayed object is then scaled in inverse proportion to the distance, as usual. On the other hand, it is also possible to rescale the cut-out object, for example, so that the displayed size of the object remains approximately equal independently of the distance.

Furthermore, image 830 of the displayed object may be intentionally shown shifted laterally out of the center of display instrument 200, for example, to indicate to the driver that he is to steer or optionally change the lane to continue to track the object. A displacement of the object in image 830 to the right could mean, for example, that the driver is thus to be prompted to steer to the right.

If multiple objects are relevant simultaneously in a specific situation, for example, during a target object change, they may optionally also be shown simultaneously.

Figure 9:
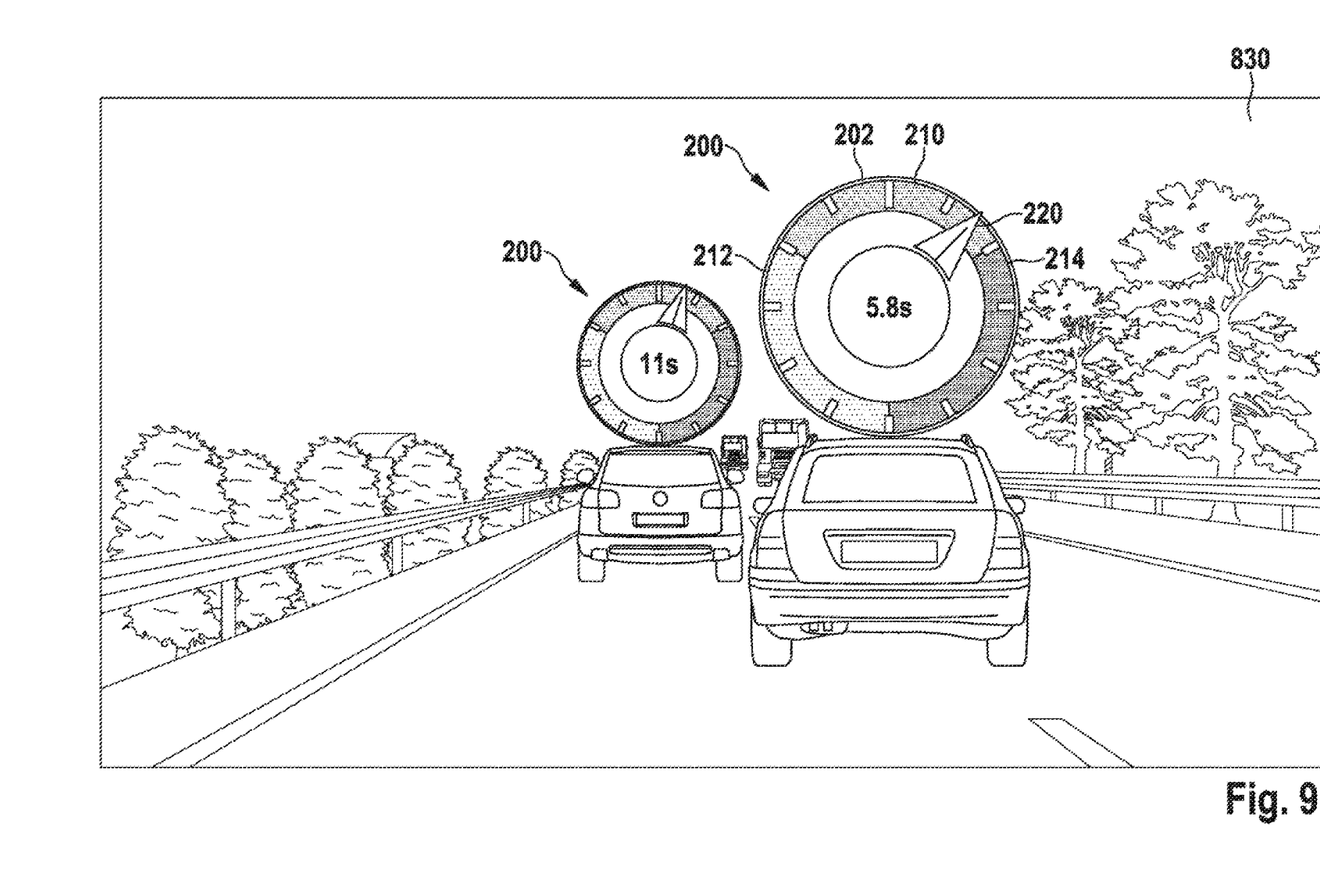
FIG. 9 shows another view of a display unit according to one exemplary embodiment of the present invention.

FIG. 9 shows a possible representation of one or multiple TTC speedometers 200, according to another exemplary embodiment of the present invention. In this case, one TTC speedometer 200 is overlaid in camera image 830 for each relevant object. In contrast to the exemplary embodiment shown in FIG. 8, one image of the object is therefore not embedded in the representation of the TTC speedometer, but rather a representation of TTC speedometer 200 is embedded in image 830 of the object. TTC speedometer 200 may be shown in simplified form in this case. For example, scale 202 may be shown without numbers and integrated into sectors 210, 212, 214. Sectors 210, 212, 214 may be shown in a ring shape and in different colors. A time to a collision with the object, with which TTC speedometer 200 is associated, may be indicated in an area enclosed by sectors 210, 212, 214. The time specification is determined under the assumption that the velocities of the host vehicle and the other vehicle are not changing. The time specification may be backed with a color, a color selection being dependent on a variable of the value indicated by the time specification. For example, the value of the time specification may initially be calculated and subsequently a color associated with the value may be selected for the background of the time specification.

FIG. 9 shows two TTC speedometers 200. A first TTC speedometer 200 is associated with a first directly preceding vehicle. It displays as a time specification a value of 5.8 seconds. The time specification is backed with a yellow color, which excites attentiveness. A dimension of first TTC speedometer 200 is adapted to an illustrated size of the first vehicle.

A second TTC speedometer 200 is associated with a second vehicle located ahead of the first vehicle. It displays as a time specification a value of 11 seconds. The time specification is backed with a green color, which indicates safety. A dimension of second TTC speedometer 200 is adapted to a displayed size of the second vehicle. Second TTC speedometer 200 is shown smaller than first TTC speedometer 200 here, whereby it is clear to the driver that the second vehicle is located farther away than the first vehicle.

Further TTC speedometers may be displayed. If sufficient space for the display of multiple TTC speedometers is not available, two or more TTC speedometers may partially or entirely mutually overlap one another. The TTC speedometers which are more important for the driving task preferably conceal the less important ones. The TTC speedometers having smaller absolute values of the TTC are generally more important than those having greater absolute values.

According to this exemplary embodiment, the display of TTC speedometer 200 is carried out in camera image 830. Instead of displaying a camera image detail inside the TTC speedometer, vice versa, one or multiple TTC speedometers 200 may also be overlaid into camera image 830, which is displayed to the driver.

In the example of FIG. 9, in particular two objects are relevant. Therefore, one TTC speedometer 200 is displayed for each of them, which moves here with the object and adapts itself in size to the object in image 830.

A greater advantage of the system is clear in the event of vision distraction, if the driver has turned his view briefly away from the traffic events and then must again obtain an image of the new situation. The driver must first again observe an object for a specific time using his eyes in this situation, until he may well estimate the instantaneous distance change, the TTC, or a similar variable.

In contrast, if he looks at TTC speedometer 200, he may immediately read off the variable important to him. This gain in time is also a gain in safety.

Furthermore, the human as a driver has the problem that the eyes must alternately focus on long distances for the object distance and a short distance corresponding to the distance to the dashboard. This procedure of refocusing is called accommodation. The accommodation requires a specific time, which also becomes greater with increasing age.

TTC speedometer 200 offers the advantage here that while the eye is focused on the vicinity, for example, to read off other display instruments or the navigation information or the onboard computer display, in the meantime the TTC may be read off again and again, i.e., the most important variable for the longitudinal intervention. The driver may even approximately read off from the TTC how many seconds still remain to him until he must again directly observe the traffic.

According to one exemplary embodiment of the present invention, a combination of a visual display with an acoustic output is carried out.

Many drivers, certainly not every driver, would consider coupling of TTC speedometer display 200 with a suitable acoustic output to be an advantage.

In the case of this optional supplementation of TTC speedometer 200, different acoustic signals are output as a function of the present TTC, which indicate to the driver whether he should accelerate or brake and at which intensity the intervention should be carried out or whether he may presently continue without intervention.

A similarity to the acoustic variometer in gliders exists here, which continuously informs the pilot acoustically about sinking and climbing, so that he may control the aircraft appropriately.

It is also reasonable to give the automobile driver short acoustic feedback messages about status changes, for example, if the target object has just changed, disappeared, or appeared.

It is reasonable to give the driver the option of selecting the volume and the type of the acoustic information.

The driver should also have the option of influencing the frequency of the acoustic messages. For example, it may be desirable for the system to generally remain silent, but in situations in which an intervention will very probably be necessary, to output items of acoustic information.

In this setting, the system becomes a warning system, which only alarms the driver if necessary.

The figures previously represented TTC speedometer 200 in each case as a round instrument. This is also the preferred form of display, since all numeric values from $-\infty$ to $\infty$ occur on the TTC scale and because these two infinity points are also congruent with one another.

Figure 10:
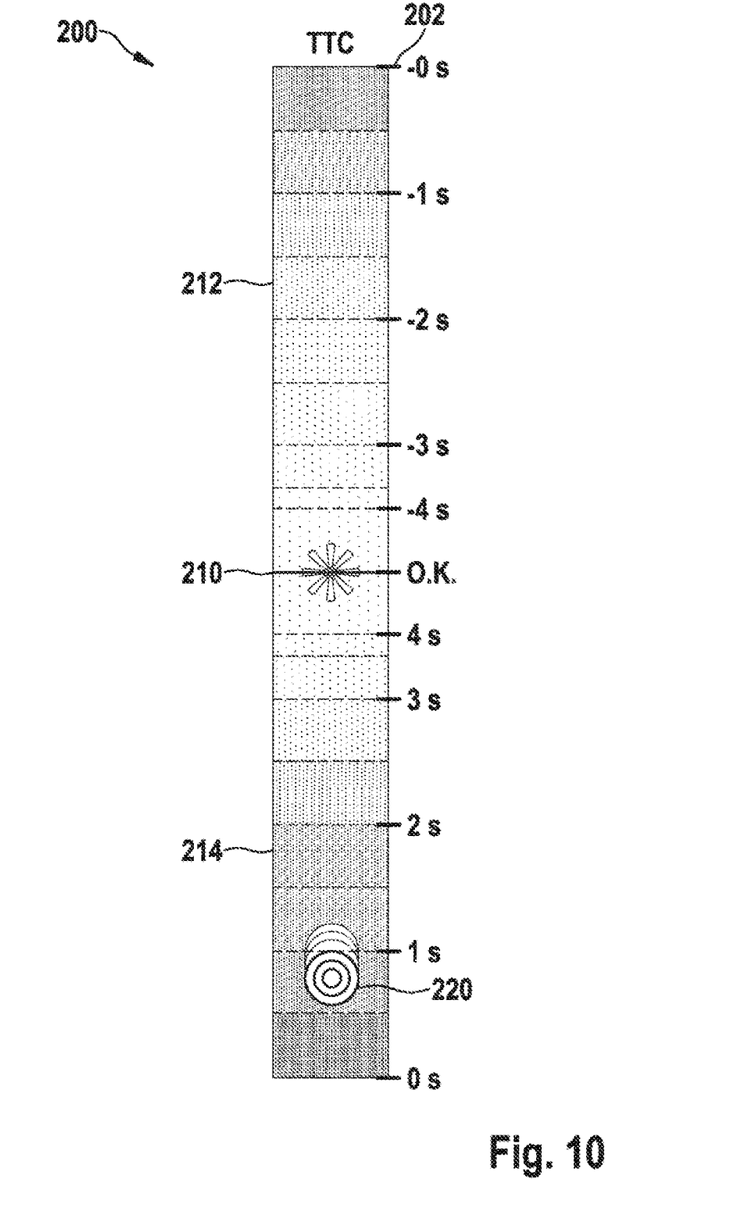
FIG. 10 shows another view of another display unit according to one exemplary embodiment of the present invention.

FIG. 10 shows a TTC speedometer 200 in an alternative design, according to another exemplary embodiment of the present invention. Another possible visualization of the TTC is shown, here having a linear scale 202 instead of a round scale. Time TTC until the collision is plotted on scale 220. Sector 210 is located in the center, which may be identified with the expression "OK", for example. In the bottom area, sector 214 is located, which may be identified with the expression "brake!", for example. In the top area, sector 212 is located, which may be identified with the expression "accelerate!", for example. The display may be backed with colors, the spectral colors of the light from red to violet being able to be run from bottom to top. The prevailing driving condition may be indicated by a circular marking 220.

During the tracking of an object, the case may actually occur that all points of scale 202 are run through. Even a sign change at the point TTC=0 is possible, specifically if the TTC relates to a plane ahead of the camera plane, i.e., for example, the front plane. An object which travels through the front plane, for example, at a height above the engine hood, would cause such a sign change of the TTC. However, since this case will be rarely encountered, this point TTC=0 of scale 202 is particularly well suitable to be cut off here. Thus, a three-quarters of a circle scale, semicircle scale, one-third of a circle scale, linear scale, or the like may also be formed from the previous complete circle scale.

FIG. 10 shows an example of such a visualization with the cut at TTC=0 along a linear scale 202.

In addition, the scale is backed with a continuous color profile here. In the red area, the TTC is positive, i.e., the collision is imminent. In the deep red area, from approximately 2 seconds to 0 seconds, a braking intervention is urgently necessary. The black and white rings at approximately TTC=0.8 seconds identify the present actual state and the fading rings behind them identify a short-term history. The data originate from a real video-based measurement with $v_{Host}$=20 m/s toward a stationary object, the collision still just being prevented by an obstacle avoidance maneuver here. In the area with a green to blue background, TTC<0, which means that the distance to the preceding vehicle is increasing.

The "infinity point" to be sought for following travel is identified here with "OK" and a fixed star.

According to one exemplary embodiment, a combination with light signals and colors is possible. TTC speedometer 200 may thus be supplemented with an output option for light signals. For example, an outer collar around TTC speedometer 200 is shown in FIG. 2, in which light-emitting diodes are provided. The collar may be shown in red here, because the TTC is small here.

If these light sources output light signals which change chronologically or change in color, the perceptibility of the TTC output may thus be improved. For example, the light sources could flash red if a braking intervention is necessary and increase their flashing frequency if the intervention becomes more urgent.

Therefore, an influence of the attentiveness of the driver is achieved: The light signals, in particular if they vary chronologically, may even be perceived by the driver in his peripheral field of vision, i.e., even if he is not looking directly at TTC speedometer 200.

With the change of light colors, the change occurring continuously or in a switchover, it may be indicated to the driver, for example, which mode he is presently in (following, brake!, accelerate!). The light colors may be selected according to the preferred selection of the colors described on the basis of FIG. 3.

Instead of a collar of light-emitting diodes, there are countless other possibilities for incorporating light sources, for example, an alternating illumination of pointer 220.

Furthermore, it is advisable to indicate intervals on TTC speedometer 200 to the driver by light sources, for example, as a light band. This relates in particular to section 210 "follow" of variable size described on the basis of FIGS. 4 and 5.

The light sources may also be attached at another location outside TTC speedometer 200, for example, at the lower edge of the front windshield.

According to one exemplary embodiment of the present invention, a heads-up display having TTC speedometers is implemented.

Alternatively to the attachment of TTC speedometer 200 in the dashboard, the option also exists of displaying TTC speedometer display 200 via a heads-up display, i.e., displaying it to the driver by reflection via the front windshield or an additional window pane.

According to another exemplary embodiment of the present invention, consideration of the acceleration is carried out. The acceleration may also be taken into consideration in the determination of the TTC. This may be the host's acceleration, which is determined by derivation of the velocity signal or is measured using an acceleration sensor, or it may even be the relative acceleration, measured using a radar sensor, for example.

While previously the assumption has predominantly been made that the determination of the TTC is based on the assumption of a constant velocity, in contrast, the incorporation of the acceleration generally results in more dynamic behavior of the TTC signal.

In combination with the display via TTC speedometer 200, this higher dynamic response has the advantage for the driver that he receives feedback with respect to his actuation of gas and brake pedals more rapidly. He is thus informed more directly about the effects of his actions. This may be perceived to be very advantageous.

According to one exemplary embodiment, an application for reversing, taking into account rear and lateral traffic is carried out.

All observations which were described here on the basis of a camera oriented forward may be directly applied to a camera that is oriented toward the rear, for example, a rear view camera. Possible applications are the assistance during reversing, for example, maneuvering, parking, to thus be able to inform the driver via the TTC with respect to possible collisions with obstructions or other vehicles.

Furthermore, it is also possible to provide information via the TTC with respect to a vehicle approaching from the rear, in particular if the host vehicle moves forward more slowly than the object approaching from the rear and a risk of collision exists.

This also applies for passing procedures, in which the host vehicle is to be passed. Its driver may estimate better with the aid of a TTC display 200 whether and how much time still remains to him for a lane change.

In particular for the display of TTC values for the rear and lateral traffic, it may be advantageous to house TTC speedometer 200 or even multiple thereof at other locations. A particularly suitable location for TTC speedometer 200 for lateral traffic is in the surroundings of the particular lateral rearview mirror.

Correspondingly, the proximity to the monitor of the rear view camera is particularly favorable for TTC speedometer 200 for the rearward vision.

Instead of or in addition to the display of the time-to-collision, variables which are similar to the TTC may also be displayed, for example, a mathematical linkage of the TTC and the distance to the target object. In the most general case, these are all variables which allow the driver to control a following travel behind the preceding vehicle and in particular to avoid a collision by braking interventions.

The approach according to the present invention may build on a camera-based object tracking method, which provides an algorithm which may determine the scaling change from image to image and therefore the TTC at high precision, with acceptable computing time at the same time. The quality of the video-based results may therefore be used for a driver assistance product including the TTC speedometer.

A TTC speedometer is ideally suitable to be combined with the camera-based object tracking method. In addition, an application of the TTC speedometer for sensors other than video sensors is also conceivable, for example, for radar or lidar.

A corresponding TTC speedometer represents an instrument which is intuitively well comprehensible and useful, and which provides a gain in safety and promotes economical driving.

The exemplary embodiments described and shown in the figures are only selected as examples. Different exemplary embodiments may be combined with one another in their entirety or with respect to individual features. One exemplary embodiment may also be supplemented by features of another exemplary embodiment. Furthermore, method steps according to the present invention may be executed repeatedly and in a sequence other than the sequence described.

What is claimed is:

1. A method for determining an item of control information for displaying a driving condition of a vehicle with aid from a display unit of the vehicle, the method comprising:
   ascertaining a safe driving condition of the vehicle in which no risk of a collision with an object exists;
   ascertaining a prevailing driving condition of the vehicle in relation to the safe driving condition; and
   determining the item of control information for activating the display unit based on the safe driving condition and the prevailing driving condition, wherein the item of control information causes the display unit to display of an item of information about the prevailing driving condition together with a relationship between the item of information about the prevailing driving condition and an item of information about the safe driving condition.

2. The method as recited in claim 1, wherein:
   the display unit has a marking associated with the safe driving condition;
   a comparison is performed between the safe driving condition and the prevailing driving condition; and
   the item of control information represents the item of information about the prevailing driving condition as a function of the comparison in relation to the marking.

3. The method as recited in claim 1, wherein the item of information about the prevailing driving condition represents a time duration until a collision between the vehicle and the object.

4. The method as recited in claim 3, wherein the item of information about the prevailing driving condition is displayed on a circular scale.

5. The method as recited in claim 4, wherein the scale includes a first sector representing a safe driving condition and a second sector representing an unsafe driving condition.

6. A method for determining an item of control information for displaying a driving condition of a vehicle with aid from a display unit of the vehicle, the method comprising:
   ascertaining a safe driving condition of the vehicle in which no risk of a collision with an object exists;
   ascertaining a prevailing driving condition of the vehicle in relation to the safe driving condition; and
   determining the item of control information for activating the display unit based on the safe driving condition and the prevailing driving condition, wherein:
      the item of control information causes a display of an item of information about the prevailing driving condition in relation to an item of information about the safe driving condition by the display unit;
      the display unit has a marking associated with the safe driving condition;
      a comparison is performed between the safe driving condition and the prevailing driving condition;
      the item of control information represents the item of information about the prevailing driving condition as a function of the comparison in relation to the marking;
      the display unit includes (i) a first sector associated with a first driving condition in which a distance between the vehicle and the object remains at least approximately constant, (ii) a second sector associated with a second driving condition in which the distance between the vehicle and the object decreases, and (iii) a third sector associated with a third driving condition in which the distance between the vehicle and the object increases; and
      the item of control information represents the prevailing driving condition as a function of the comparison in one of the first section, the second sector, or the third sector.

7. The method as recited in claim 6, wherein the item of control information sets a size ratio among the first sector, the second sector, and the third sector as a function of the item of information about the velocity of the vehicle.

8. A method for assisting a driver of a vehicle during a driving task with aid from a display unit, comprising:
   determining an item of control information for displaying a driving condition of a vehicle with the aid of a display unit of the vehicle, wherein the determining includes:
      ascertaining a safe driving condition of the vehicle in which no risk of a collision with an object exists;
      ascertaining a prevailing driving condition of the vehicle in relation to the safe driving condition; and
      determining the item of control information for activating the display unit based on the safe driving condition and the prevailing driving condition, wherein the item of control information causes a display of an item of information about the prevailing driving condition together with a relationship between the item of information about the prevailing driving condition and an item of information about the safe driving condition by the display unit;
   providing the item of control information to the display unit; and
   displaying the item of information about the prevailing driving condition together with the relationship between the item of information about the prevailing driving condition and the item of information about the safe driving condition of the vehicle with the aid of the display unit, in response to the item of control information.

9. A device for determining an item of control information for displaying a driving condition of a vehicle with aid from a display unit of the vehicle, comprising:
   means for ascertaining a safe driving condition of the vehicle in which no risk of a collision with an object exists;
   means for ascertaining a prevailing driving condition of the vehicle in relation to the safe driving condition; and
   means for determining the item of control information for activating the display unit based on the safe driving condition and the prevailing driving condition, wherein the item of control information causes the display unit to display of an item of information about the prevailing driving condition together with a relationship between the item of information about the prevailing driving condition and an item of information about the safe driving condition.

10. A non-transitory computer-readable data storage medium storing a computer program having program codes which, when executed on a computer, performs a method for determining an item of control information for displaying a driving condition of a vehicle with the aid of a display unit of the vehicle, the method comprising:

ascertaining a safe driving condition of the vehicle in which no risk of a collision with an object exists;

ascertaining a prevailing driving condition of the vehicle in relation to the safe driving condition; and     determining the item of control information for activating the display unit based on the safe driving condition and the prevailing driving condition, wherein the item of control information causes the display unit to display of an item of information about the prevailing driving condition together with a relationship between the item of information about the prevailing driving condition and an item of information about the safe driving condition.

11. A display unit for displaying a driving condition of a vehicle, comprising:

an interface coupled to a processing device, wherein the processing device is configured to:

ascertain a safe driving condition of the vehicle in which no risk of a collision with an object exists;

ascertain a prevailing driving condition of the vehicle in relation to the safe driving condition; and         determine an item of control information for activating the display unit based on the safe driving condition and the prevailing driving condition;

a first display area associated with a first driving condition in which a distance between the vehicle and the object remains at least approximately constant;

a second display area associated with a second driving condition in which the distance between the vehicle and the object decreases; and     a third display area associated with a third driving condition in which the distance between the vehicle and the object increases;

wherein:

the display unit is configured for receiving, via the interface and from the processing device, the item of control information, thereby causing the activation of the display unit for display, by the display unit in a selected one of the display areas, of an item of information about the prevailing driving condition of the vehicle in relation to an item of information about the safe driving condition of the vehicle; and         the display area that is selected for the display depends on the relation.

12. The display unit as recited in claim 11, further comprising a display area for displaying an image of the object.

13. The display unit as recited in claim 11, wherein the item of information about the prevailing driving condition represents a time duration until a collision between the vehicle and the object.

14. The display unit as recited in claim 13, wherein the item of information about the prevailing driving condition is displayed on a circular scale.

15. The display unit as recited in claim 14, wherein the scale includes a first sector representing a safe driving condition and a second sector representing an unsafe driving condition.

* * * * *